Aug. 6, 1946.   W. P. MUELLER ET AL   2,405,229
ELECTRICAL OSCILLATORY SYSTEM AND APPARATUS
Filed Oct. 30, 1941    2 Sheets-Sheet 1
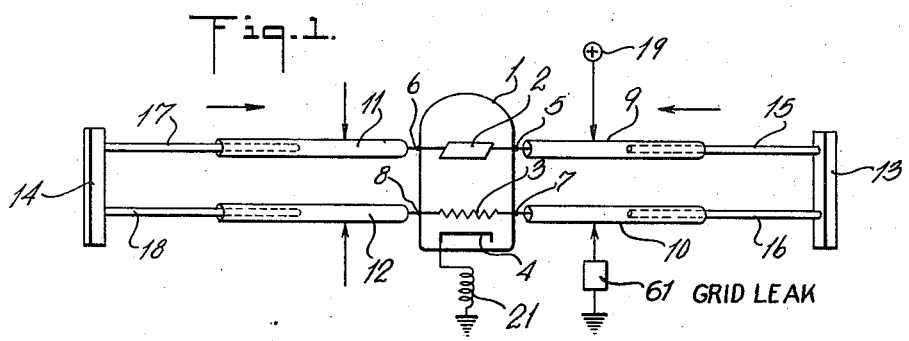
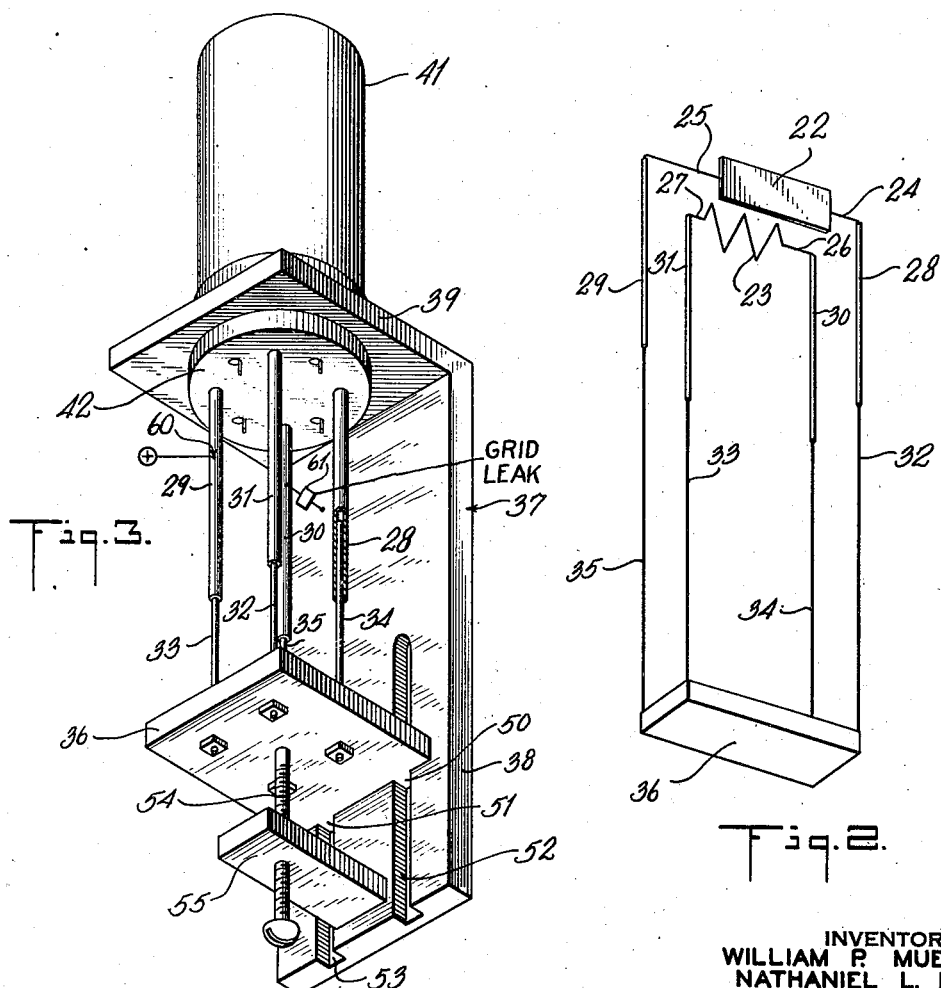
INVENTORS
WILLIAM P. MUELLER
NATHANIEL L. KISER
BY John J. Rogan
ATTORNEY

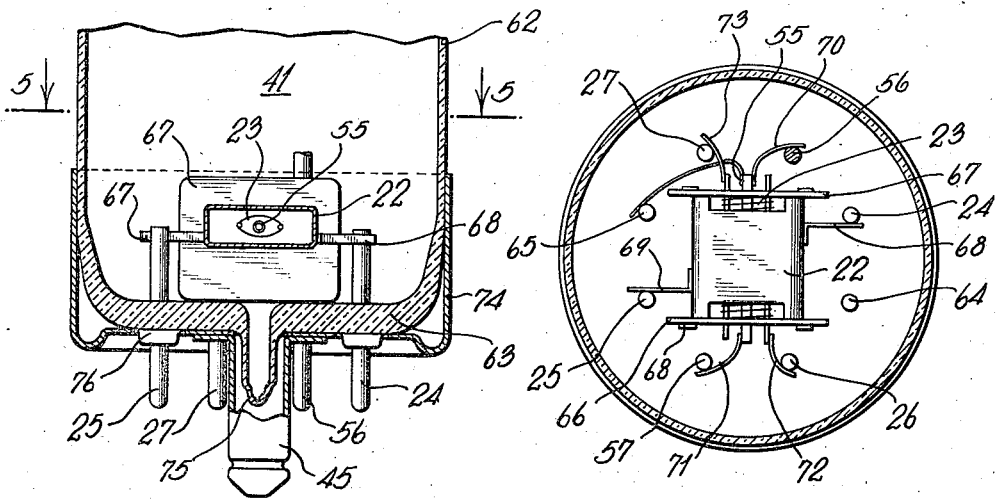
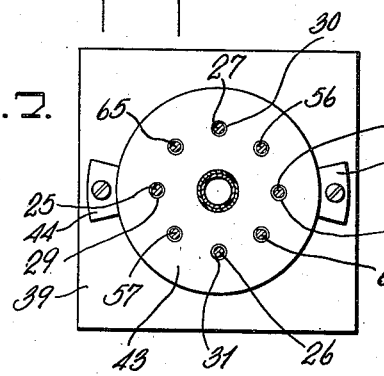
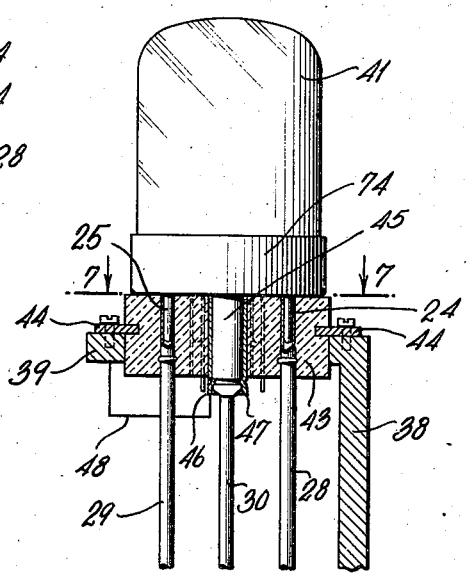
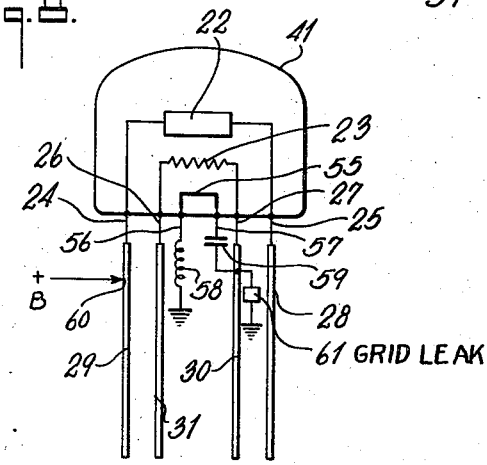

Patented Aug. 6, 1946

2,405,229

UNITED STATES PATENT OFFICE 2,405,229

ELECTRICAL OSCILLATORY SYSTEM AND APPARATUS

William P. Mueller and Nathaniel L. Kiser, Emporium, Pa., assignors to Hygrade Sylvania Corporation, Emporium, Pa., a corporation of Massachusetts Application October 30, 1941, Serial No. 417,068

5 Claims. (Cl. 250—36)

This invention refers to the production and utilization of electrical oscillations, and in particular to the design and arrangement of the circuit elements constituting the oscillation circuits of the type incorporating tuned transmission lines.

For the generation of high frequencies, in particular of ultra-high frequencies of the order of several hundred megacycles, simple and effective oscillation circuits can be obtained by connecting the two wires forming a tuned transmission line on one end of the line to grid and plate of a triode or pentode. The other end of the transmission line may be either short circuited, constituting a "quarter wave line"; or they may be open, constituting a "half wave line."

Quarter wave lines are usually preferable to half wave lines, because of their higher Q value for given diameters of the wires forming the transmission line, and because the overall length of the circuit is smaller.

The actual length of the "transmission line" is only part of the oscillation circuit, which may be considered as made up of a transmission line closed by the reactance of the tube leads and the capacity formed by grid and plate of the tube used in the circuit. It is usually shorter than a quarter, (or a half) wave length, as the effective reactance of the tube elements and leads is usually capacitive and smaller than the unit length capacity of the transmission line. When the value of the effective grid to plate capacitance of the tube comes nearer to the unit length capacity of the transmission line, the actual length of the attached tuned line becomes very short, and better stability may be obtained by an open-ended line, i. e. a half wave line, whose actual length may, however, not be much larger than a quarter wave length.

Frequency stability in these oscillation circuits depends to a large extent on the ratio of the capacitive reactance offered by the tube leads and electrodes to the unit length capacity of the transmission line. Better stability, or stability at high frequencies for a given tube may, therefore, be obtained if two transmission lines are attached to opposite ends of the tube elements symmetrically. In the case of two quarter wave lines, the tube is placed into the center of a half wave line, closed at both ends by a short circuit, and in order practically to divide the tube capacity into two halves, it is necessary to provide a tube with symmetrical leads at the two ends of the grid and at the two ends of the anode. This known arrangement of double-ended connection has several effects. Each of the two tuned lines works substantially only into half the tube reactance, and the current through each of the tube leads is only about half of the current flowing through each lead in the case of a single transmission line circuit.

A number of different tube designs have been carried out which allow effective operation in such a double-ended symmetrical tuned line circuit. A typical arrangement is shown in a paper by A. L. Samuel, I. R. E. Proceedings, pages 1243–1252, October 1937. The tubes used in these known arrangements are expensive and the problem presented by the symmetrical seals at opposite ends of the plate electrode and of the grid electrode through the envelope requires the full attention of an experienced glass blower. Other disadvantages of the known double-ended tuned line circuit are its doubled overall length and the inconvenience in tuning. This tuning is generally carried out by varying the length of each transmission line by telescoping rods or tubings at the two ends far removed from the oscillator tube.

It is, therefore, the main object of this invention to devise a double-ended ultra-high frequency oscillation circuit, which has an overall length substantially equal to that of the single tuned transmission line circuit.

Another main object of the invention refers to the construction and circuit application of a tube, which is provided with two symmetrical end leads for the plate electrode and two symmetrical end leads for the grid electrode, and which can be sealed and manufactured entirely with the standard equipment used for the production of ordinary radio receiving tubes.

Finally, it is a main object of the invention to build a double-ended transmission line circuit, in which two tuned lines can be simultaneously tuned to any desired frequency within limits.

A feature of the invention refers to the construction of a quadruple gang tuning device consisting of four parallel metal rods or tubes, which can be telescoped into or over four other pieces of tubing which form the two branches of two tuned lines.

Another feature of the invention refers to the mutual or what may be termed "folded over" position of the two tuned lines of a double-ended transmission line circuit.

A feature of the invention refers to the spacing of the different wires or tubings adapted to fit directly into the two grid and the two plate lead pins of radio tube base headers.

A further feature of the invention refers to the perfect balancing of the various tube electrodes and elements used in a double-ended single tube transmission line circuit.

The invention will now be described in connection with the drawings, which show circuits made up with two symmetrical tuned "half wave lines," it being understood that the invention may be carried out for two symmetrical quarter wave lines with certain modifications.

For obvious reasons, the plate voltage is applied to a point of the transmission line in which the high frequency voltage is zero, and the high frequency current is a maximum. In the case of a half wave line, one high frequency voltage maximum is at the open end of the line, another at the tube itself. Between these two points, nearer to the tube end, is a current maximum and a voltage node, and the D. C. plate voltage lead is, therefore, connected to this point.

In the case of the quarter wave line, which is short circuited at the end removed from the tube, the voltage node is at the short circuited end. In order to block the grid of the triode from the D. C. voltage, a D. C. blocking condenser must be introduced. This blocking condenser may be placed at any convenient point, but is preferably introduced at the far end of the quarter wave line, where it may serve the purpose of a high frequency short circuit at the same time. The D. C. voltage lead is then connected to the plate side of the blocking condenser.

Fig. 1 shows a schematic diagram of a conventional double-ended circuit for operation of a single tube with two half wave lines.

Fig. 2 shows a schematic diagram of the new double-ended circuit.

Fig. 3 shows a perspective view of the new double-ended circuit, including the mounting.

Figs. 4 and 5 show details of a triode tube construction adapted for operation in the new circuit.

Fig. 6 is a detail view of the tube and socket portions of the system.

Fig. 7 is a sectional view of Fig. 6 taken along the line 7—7 thereof.

Fig. 8 is a schematic diagram to explain certain features of the invention.

Referring to Fig. 1 which represents schematically a double-ended oscillator-generator circuit, the numeral 1 represents an electron discharge tube with plate 2, grid 3 and cathode 4. The plate lead-in conductors 5 and 6 are sealed through the wall of tube 1 at opposite ends of the plate electrode, and parallel to them are sealed-in the grid leads 7 and 8. The distances between 5 and 7 and between 6, 8, are equal to each other and to the distance between the parallel conductor tubings 9 and 10 and of the conductor tubings 11 and 12 respectively, these tubings being directly connected to the corresponding lead-in conductors.

Tuning extensions fixed in insulating spacers 13 and 14 are telescoped into the two far ends of the transmission line. They consist of pairs of metal rods 15, 16, 17, 18, which slide snugly inside the tubings 9, 10, and 11, 12 respectively. The D. C. connection to plate 2 from the positive D. C. high voltage terminal 19, and from grid 3 to grid leak 20 and to ground, and from the cathode 4 over choke coil 21 to ground, are indicated in Fig. 1.

It will be noted, that the ultra-high frequency currents in the two plate leads 5 and 6 flow simultaneously either towards the plate, or simultaneously away from the plate, depending on the phase. The currents in the two grid leads 7 and 8 flow also at any given instant away from the grid or toward the grid, but opposite to the current in the plate leads. Current maxima and voltage nodes occur at the points indicated by the four arrows.

From the foregoing, it will be seen that in order to tune the system, the members 13 and 14 must be simultaneously moved in unison in opposite directions. Not only does this require precision adjustment apparatus for both ends of the system, but it also requires considerable space because allowance must be made for the maximum outward movement of members 15—18. Furthermore, the system requires a special constructed tube wherein the lead-in pins or wires are specially and individually sealed through the tube walls.

In accordance with the present invention, the tuned system of Fig. 1 is in effect "folded over" on itself whereby the tuning of both line sections can be achieved from the same end and with a single direction of movement of the adjusting mechanism. Furthermore, a radio tube with standard form of base or header may be used with all the lead-in members sealed through the same end of the tube. The folded over arrangement is diagrammatically illustrated in Fig. 2, wherein only the plate 22 and grid 23 of an ultra-high frequency oscillator tube are shown. Plate 22 is provided at opposite ends with symmetric lead-in wires or pins 24, 25 (it being understood that the bulb of the tube and the cathode are omitted for purposes of explanation); and likewise grid 23 is provided at opposite ends with lead-in wires or pins 26, 27. The four lead-in wires are connected directly to the tuning transmission line extensions 28—31, all of which are of tubular conductive material and extend in the same direction from the electrode assembly and parallel to each other. Extensions 28—31 are provided with corresponding snugly fitted telescoping metal rods 32—35 which are rigidly united at their remote ends by the insulation block 36. The system of Fig. 2 can then be considered as that of Fig. 1 if the latter were "folded-over" at the points 5—7 and 6—8.

In the "folded-over" position, the two half wave lines do not extend in opposite directions from the tube. They form now a four wire system, terminating at one end in the tunable open end 36, and on the tube side, into the four double end leads of grid and plate of the oscillator tube at the other end. The principal advantage of the double-ended circuit of Fig. 1, viz., an increase of the upper frequency limit over that of a single half wave line, is however still obtained, while the main disadvantages of the double-ended operation of Fig. 1 are eliminated.

The overall length of the system is the same as for single-ended transmission line operation. The tuning of the two lines can be carried out by a single slidable four rod gang attached to insulating spacer 36, which may telescopically engage the stationary parts 28—31 of the two lines connected to the two ends of grid and plate of the tube. Finally, it is not necessary to use a tube in which individual seals through the envelope are provided for obtaining two symmetrical leads from each of the tube electrodes to which the quarter wave lines are connected. These expensive tubes may still be used, if desired, but the new circuit permits the use of tubes in which symmetrical double leads from the ends of each electrode are carried through the single header at one end of the radio tube.

The actual working embodiment of the invention shown in Fig. 3 consists of an L-shaped metal base 37, with a long horizontal part 38 and a short vertical leg 39. In the short leg is mounted a "lock-in" tube base 40, carrying a "lock-in" tube 41, with double-ended grid connections and double-ended plate connections as will be described in connection with Figs. 4–8 and as covered in copending application Serial No. 416,440 Patent #2,301,914, granted Nov. 17, 1942. The four lead-pins of grid and plate are arranged alternately in the corners of a square.

The tube is arranged to be plugged into a spring socket 42 of any well-known construction, such for example as the well-known "Octal" socket. Preferably however, the socket is as shown in Figs. 6 and 7 consisting of an insulation button or wafer 43 into the periphery of which is molded a thin metal mount ring 44 for attachment to the plate 39. Button 43 has a series of eight openings therethrough arranged around the center thereof and in each of these openings is mounted a contact member. Into four of these openings are fastened the ends of the tubular metal members 28—31 which are held in place in the respective openings in button 43 in any suitable manner. These four tubular members connect respectively with the two ends of the grid electrode and the two ends of the plate electrode which are symmetrical with respect to the center of the tube. In the case of triode, three additional pins are provided on the tube, namely the cathode pin and the two heater pins which plug in to corresponding spring contacts mounted in the button 43. The ends of the tubular members 28—31 which engage the pins on the plugged-in tube may be split or otherwise radially expansible so as to grip resiliently the corresponding tube pins 24—27. If the tube is of the well-known "lock-in" type, the base of the tube also has a central locating and locking member 45 which is adapted to contact with a metal sleeve 46 fastened in the button 43, one end of sleeve 46 being split or otherwise radially resilient and having an inwardly extending lip or flange 47 to engage the corresponding peripheral groove on the end of the locking member 45 of the tube. The contact sleeve 46 is connected in any suitable way, for example by a short metal strap 48 to the grounded metal plate 39.

Instead of making the tuning extensions 28—31 an integral part of the socket, any conventional "Octal" socket can be employed with the members 28—31 soldered or otherwise fastened to the contact springs of the socket so as to form electrical elongations thereof. The members 28—31 in effect therefore, form continuations of the respective tube pins and they are preferably of copper tubing, and extend parallel to each other at the distances fixed by the pin leads. At the end of these tubings 28—31 remote from the oscillator tube there are provided the four tuning rods 32—35 which are rigidly fixed parallel to each other in the insulating spacer block 36. The tuning rods which are rigidly mounted in insulating spacer 36 are spaced so as to be in axial alignment with the corresponding members 28—31 so that they snugly fit and telescope simultaneously into the said members. Spacer 36 also serves as a support of the transmission line array on the long leg 38 of the base plate, and provides a uniform spacing of the lines parallel to member 38. For this purpose, member 36 is formed on its edge with two guiding lugs 50, 51, which are slidable in parallel grooves 52, 53, in member 38.

Spacer 36 can be moved back and forth in the direction of the transmission lines, by means of a screw 54 and a threaded block 55 fastened to member 38, whereby the tuning of the two transmission lines by equal amounts is simultaneously carried out.

By employing a tube such as shown in Figs. 4–6, as a part of the circuit the advantage is obtained that the two pairs of lead pins of the grid and plate electrodes are straight, direct continuations of the attached transmission lines, thus differing as little as possible in unit length capacity and inductance from the transmission line constants.

Due to the neighborhood of the cathode and heater leads in the tube, the capacities of the plate and grid leads in the tube with respect to the cathode is, however, different from the ground capacities of the rods and tubings forming the transmission lines themselves, and it is necessary to balance cathode and heater with respect to ground. It has been found by experiment that this balancing may be carried out much easier by providing two cathode leads in the tube. The two cathode pins of tube 41 are connected to the two ends of the cathode, similarly to the two pins connected to the two ends of the grid and the two pins connected to the two ends of the anode.

Fig. 8 shows schematically one way of carrying out this balancing, parts of this figure corresponding to the parts of Figs. 2, 3, 4 and 5, bearing the same numerals. The opposite ends of the cathode 55 are connected to their respective pins 56, 57. Pin 56 is connected to ground through a series inductance 58 while pin 57 is connected through a series capacitor 59 to a proper point on the leg 30 of the transmission line connected to one end of the grid 23. While Fig. 9 shows the four legs of the transmission line in the same plane, it will be understood of course that it is intended to represent the symmetrical arrangement of the legs as actually shown in Fig. 3. The positive D. C. potential supply is connected to the plate leg 29 of the tuned transmission line at the potential node point 60. Likewise grid leak 61 is connected to potential node point 62 on leg 30 and to member 38. With the proper potentials applied to the heater and with the proper bias applied to the cathode, all that is necessary to tune the circuit is to adjust the screw 54 whereby the effective length of the transmission line is varied. If desired, additional metal removable side walls and top walls may be applied to the member 37 to constitute a closed box for the variable transmission line, it being understood that suitable insulated lead-in connections are provided. If desired, the L-shaped member 37 may be supplemented by metal plates on all sides so as to form a closed box with the adjusting screw 54 extending through one end wall for adjustment purposes.

Preferably, the tube is of a structure such as illustrated and claimed in copending application of Harry M. Gaun-Nathaniel L. Kiser, Serial No. 416,440, filed October 25, 1941, and to which application reference may be made for a detailed description of the tube. However, for the purposes of completing the present disclosure, a typical tube of this construction is illustrated in Figs. 4 and 5 and comprises for example a glass bulb 62 closed off at its lower end by a header 63 which is substantially flattened in a plane transverse to the vertical axis of the tube. Sealed through the header 63 in a symmetrical path around the center thereof are a series of rigid pins or prongs 24, 25, 26, 27, 56, 57, 64, 65. The pins extend inwardly of the tube and positioned therebetween is an electrode assembly unit comprising a cathode sleeve 55 with an internal insulated heater wire, a control grid 23, preferably of the double side-rod wound grid wire type, and a box-like plate 22. The various electrodes are spaced apart and held together as a unit by two end micas 66, 67, which are held in place by turned-over lugs 68 on the plate. The electrode assembly therefore forms a rigid unitary structure and is positioned so that the electrodes extend parallel to the flat header 63. The mica members 66 and 67 extend beyond the walls of the plate so that they rest at their lower edges on the inner surface of header 63. A pair of right-angle lugs 68, 69, are welded adjacent opposite ends of the plate and these lugs are welded to the corresponding plate pins 24 and 25. The opposite ends of the cathode sleeve are connected symmetrically by short metal straps 70, 71, to the corresponding pins 56 and 57. Likewise, the control grid is connected at one end by a short metal strap 72 to pin 26 and at the opposite end by short metal strap 73 to pin 27. The ends of the heater filament or wire may be connected respectively to the pins 64, 65. The header with its sealed-in pins may therefore be of the standard type known to the industry as a "Sylvania" lock-in type and the tube is provided with a metal cup-shaped base 74 carrying the central downwardly-extending locating and locking pin 45, which also serves to enclose and protect the exhaust tubulation 75. The tube pins are insulated from the metal bottom of the base 74 by glass beads 76 which fit into corresponding openings on the said bottom. With this design of tube, it will be noted that all the electrodes are doubly connected at the ends and are joined by the shortest possible connections to the respective lead-in pins providing a completely symmetrical arrangement between the various pins and the double-ended connections with respect to the electrodes. It will be understood of course that the invention is not limited to the use of triode electrode assemblies in the tube and that assemblies of two or more grids such as a shield grid assembly, a pentode assembly or the like may be employed so long as the connections from the plate and control grid are double-ended and are symmetrically connected to respective lead-in pins all extending from the same end of the tube.

What we claim is:

1. In a high frequency system, a triode of the type having a header with a series of lead-ins arranged symmetrically around the center thereof, and symmetrically with respect to the triode electrodes, said lead-ins being in pairs for each electrode, one pair being connected to symmetrical points of the anode, and another pair being connected to symmetrical points of the grid, said lead-ins connected to said grid and anode forming part of a four-conductor transmission line, the other part of which is in telescopic relation with respect to the lead-ins and in substantial alignment therewith and geometrically extensible for tuning of the line, the ends of said other part being connected to a common rigid spacer member, and means to move said spacer member and thereby to tune the line.

2. A high frequency system according to claim 1 in which the capacitance and inductance of the said lead-ins per unit length is substantially equal to the capacitance and inductance per unit length of the said other part of the four-conductor line.

3. A high frequency system according to claim 1 in which said triode and said common rigid spacer are mounted on the same support, and said common rigid spacer is provided with adjusting means to move it with relation to the triode to extend the length of said four-conductor line.

4. A system according to claim 1 in which the triode is of the indirectly heated type, and means are also provided for electrically balancing the cathode with respect to ground.

5. A system according to claim 1 in which the triode is of the cathode type, one of said lead-ins being connected to ground through an impedance, and the other lead-in being connected to one of the grid lead-ins through a capacitance, whereby said cathode can be electrically balanced with respect to ground.

WILLIAM P. MUELLER.
NATHANIEL L. KISER.